(12) United States Patent
Liou

(10) Patent No.: US 7,050,766 B2
(45) Date of Patent: May 23, 2006

(54) FOLDABLE SATELLITE RECEIVER ASSEMBLY

(76) Inventor: Chii Moon Liou, P.O. Box 10-69, Chong-Ho, Taipei (TW) 235

( * ) Notice: Subject to any disclaimer, the term of this patent is extended or adjusted under 35 U.S.C. 154(b) by 473 days.

(21) Appl. No.: 10/402,787

(22) Filed: Mar. 28, 2003

(65) Prior Publication Data
US 2004/0192387 A1   Sep. 30, 2004

(51) Int. Cl.
*H04B 1/38* (2006.01)
(52) U.S. Cl. .................. 455/90.3; 455/575.3; 455/558; 361/827; 379/433.13
(58) Field of Classification Search ................ 455/558, 455/90.3, 575.3; 361/827; 379/433.13
See application file for complete search history.

(56) References Cited

U.S. PATENT DOCUMENTS

| | | | | |
|---|---|---|---|---|
| 5,566,226 A | * | 10/1996 | Mizoguchi et al. | 455/558 |
| 5,761,300 A | * | 6/1998 | Domoleczny | 379/433.13 |
| D420,990 S | | 2/2000 | Lin | D14/114 |
| D434,417 S | | 11/2000 | Lin | D14/435 |
| 6,240,302 B1 | * | 5/2001 | Harrison | 455/556.1 |

* cited by examiner

*Primary Examiner*—Nick Corsaro
*Assistant Examiner*—Alejandro Rivero

(57) ABSTRACT

A remote receiver assembly includes a remote receiver device having a card member for plugging to a computer facility, and a control member rotatably coupled to the card member for receiving remote signals. The control member includes a duct, the card member includes one or more conduits rotatably coupled to the duct of the control member, to rotatably couple the control member to the card member. The control member may be rotated relative to the card member to suitable angular position, in order to effectively receive signals. One or more cable members may couple the remote receiver device to various computer facilities.

3 Claims, 6 Drawing Sheets

FOLDABLE SATELLITE RECEIVER ASSEMBLY

BACKGROUND OF THE INVENTION

1. Field of the Invention

The present invention relates to a receiver device, and more particularly to a foldable satellite or remote receiver assembly for suitably receiving remote signals.

2. Description of the Prior Art

Typical satellite or remote receiver devices comprise a receiver member disposed in an interface card or the like, for coupling to computer facilities, such as the personal digital assistant (PDA) facilities, personal computers, notebook computers, etc., and for receiving remote signals and for sending the remote signals to the PDA facilities, the personal computers, the notebook computers, or the like.

For example, U.S. Pat. No. Des. 420,990 to Lin, and U.S. Pat. No. Des. 434,417 to Lin disclose two of the typical satellite or remote receiver devices comprise a receiver member disposed in an interface card member or the like, and the interface card member is directly plugged or coupled to PDA facilities or other computer facilities.

However, once the typical satellite or remote receiver devices have been directly plugged or coupled to the PDA facilities or other computer facilities, the typical satellite or remote receiver devices are thus solidly secured to the PDA facilities or other computer facilities and may not be moved or rotated or adjusted relative to the PDA facilities or other computer facilities, such that the typical satellite or remote receiver devices may not be adjusted relative to the PDA facilities or other computer facilities to the best angular position, to suitably receive signals.

In addition, the typical satellite or remote receiver devices have no suitable cable members for easily and readily coupling to various kinds of computer facilities.

The present invention has arisen to mitigate and/or obviate the afore-described disadvantages of the conventional satellite receiver devices.

SUMMARY OF THE INVENTION

The primary objective of the present invention is to provide a foldable satellite or remote receiver assembly including a foldable structure for allowing the satellite or remote receiver assembly to be adjusted to suitable angular position, in order to effectively or suitably receive signals.

The other objective of the present invention is to provide a foldable satellite or remote receiver assembly including a cable assembly for allowing a remote receiver device of the remote receiver assembly to be easily coupled to various computer facilities.

In accordance with one aspect of the invention, there is provided a remote receiver assembly comprising a computer facility, and a remote receiver device including a card member for plugging to the computer facility, and including a control member for receiving remote signals. The control member includes a duct, the card member includes at least one conduit rotatably coupled to the duct of the control member, to rotatably couple the control member to the card member. The control member may thus be rotated or adjusted relative to the card member to any suitable angular position, in order to effectively or suitably receive signals.

The duct of the control member includes a bore formed therein, the conduit includes a stud extended therefrom and engaged into the bore of the duct, to rotatably couple the duct and the conduit together.

The remote receiver device includes a first cap attached to the conduit, and a shaft extended from the first cap and engaged through the conduit and the duct, to rotatably couple the duct and the conduit together.

The remote receiver device further includes a second conduit provided on the card member, and a second cap attached to the second conduit and having a pole extended from the second cap and engaged into the second conduit. The first cap includes a lock stem extended from the shaft, and engaged with the pole, to lock the first and the second caps together.

A cable assembly may further be provided for coupling the remote receiver device to the computer facility, and for allowing the remote receiver device to be easily coupled to various computer facilities.

The cap includes a socket opening provided therein, the cable assembly includes a first cable member and at least one second cable member, the first cable member includes a first end having a first coupler provided thereon for coupling to the socket opening of the cap, and a second end having a second coupler provided thereon, and the second cable member includes a first end having a third coupler provided thereon for coupling to the first coupler of the first cable member, and a second end having a fourth coupler provided thereon for coupling to the computer facility. The second cable member includes a fifth coupler coupled thereto with a manifold, for coupling to electric power sources.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
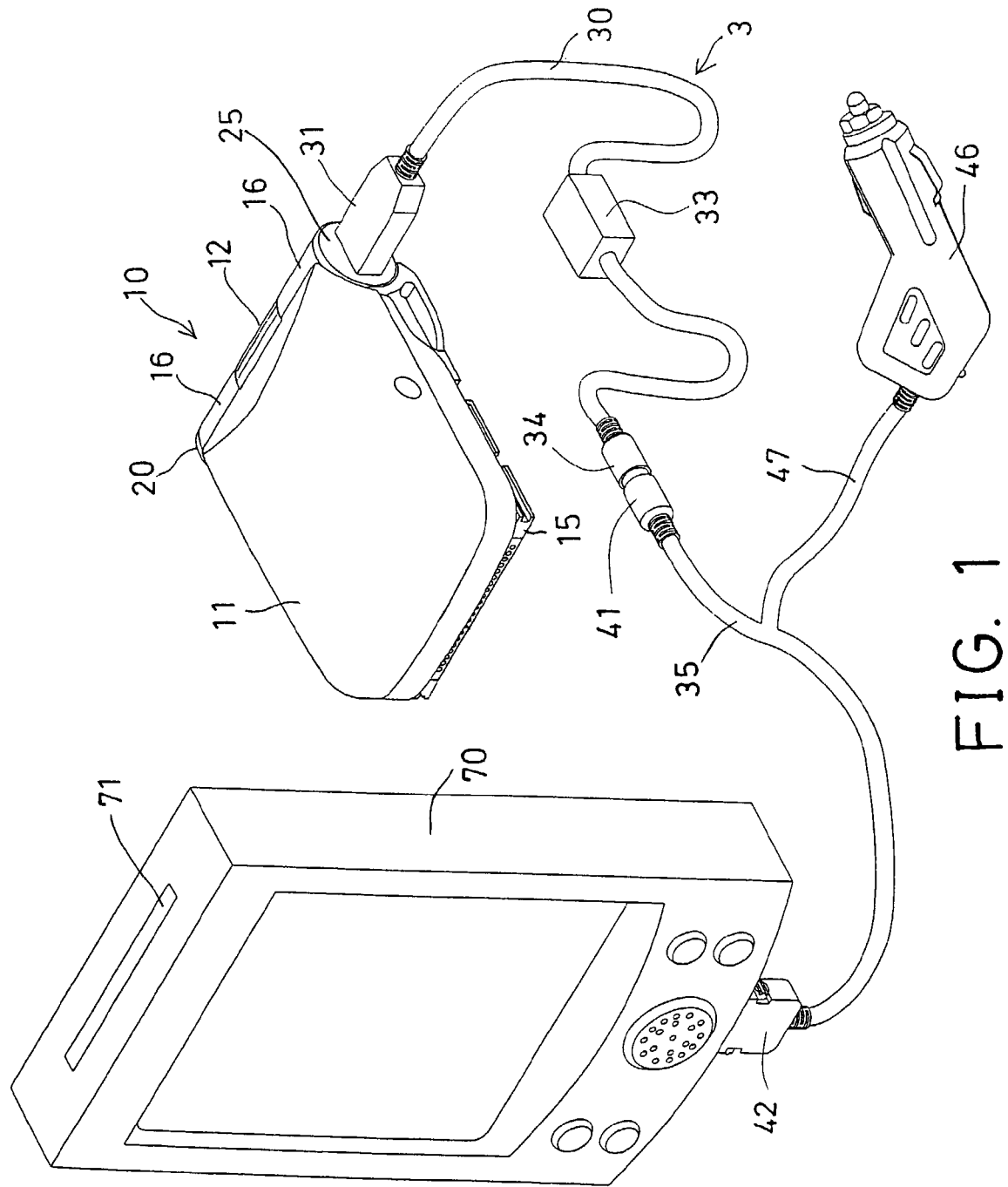
FIG. 1 is a perspective view of a foldable satellite receiver assembly in accordance with the present invention.

Referring to the drawings, and initially to FIGS. 1–4, a foldable satellite or remote receiver assembly in accordance with the present invention comprises a satellite or remote receiver device 10 for coupling to PDA facilities 70 (FIGS. 1, 5) or other computer facilities, such as the personal computers, or the notebook computers 80 (FIG. 6), or the like, and for receiving and sending remote signals to the PDA facilities 70 or other computer facilities 80.

Figure 2:
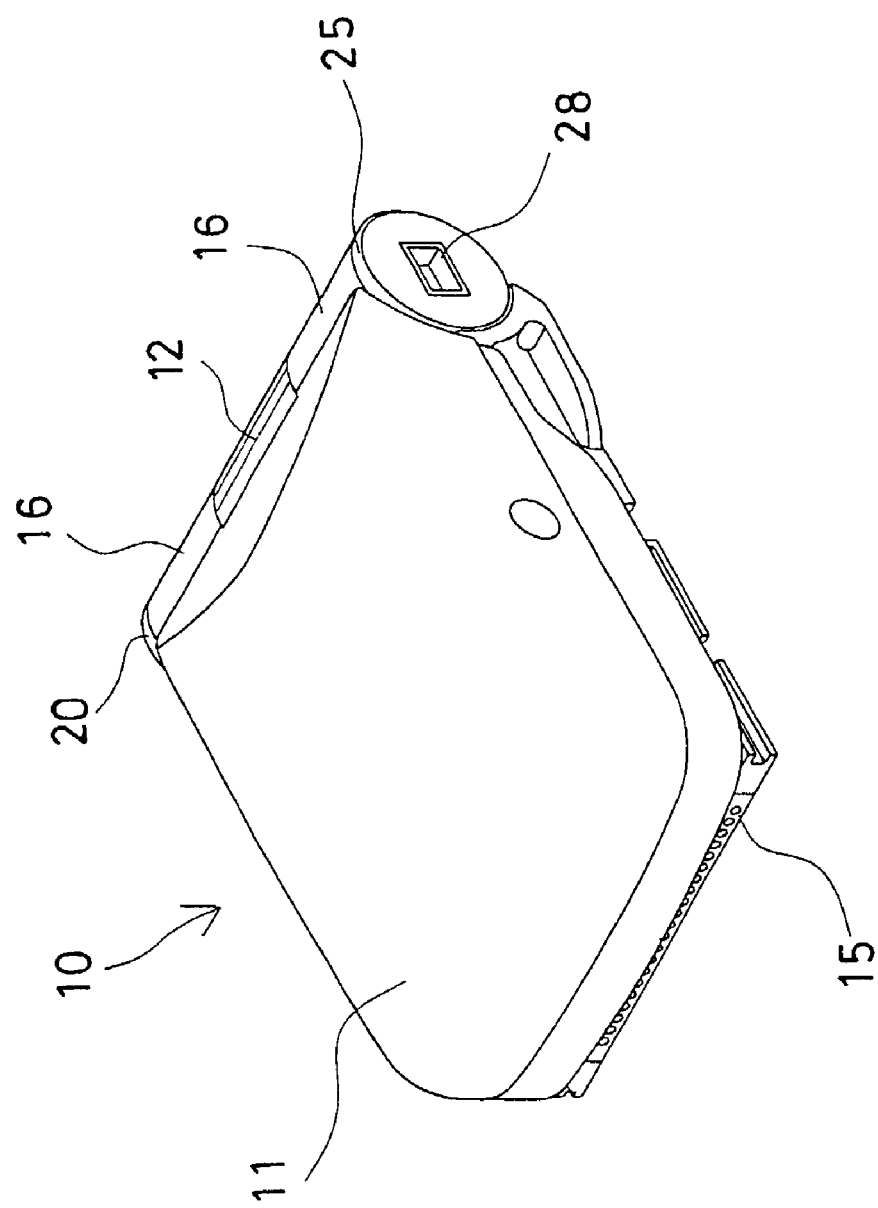
FIG. 2 is a perspective view illustrating a receiver device of the foldable satellite receiver assembly.
Figure 3:
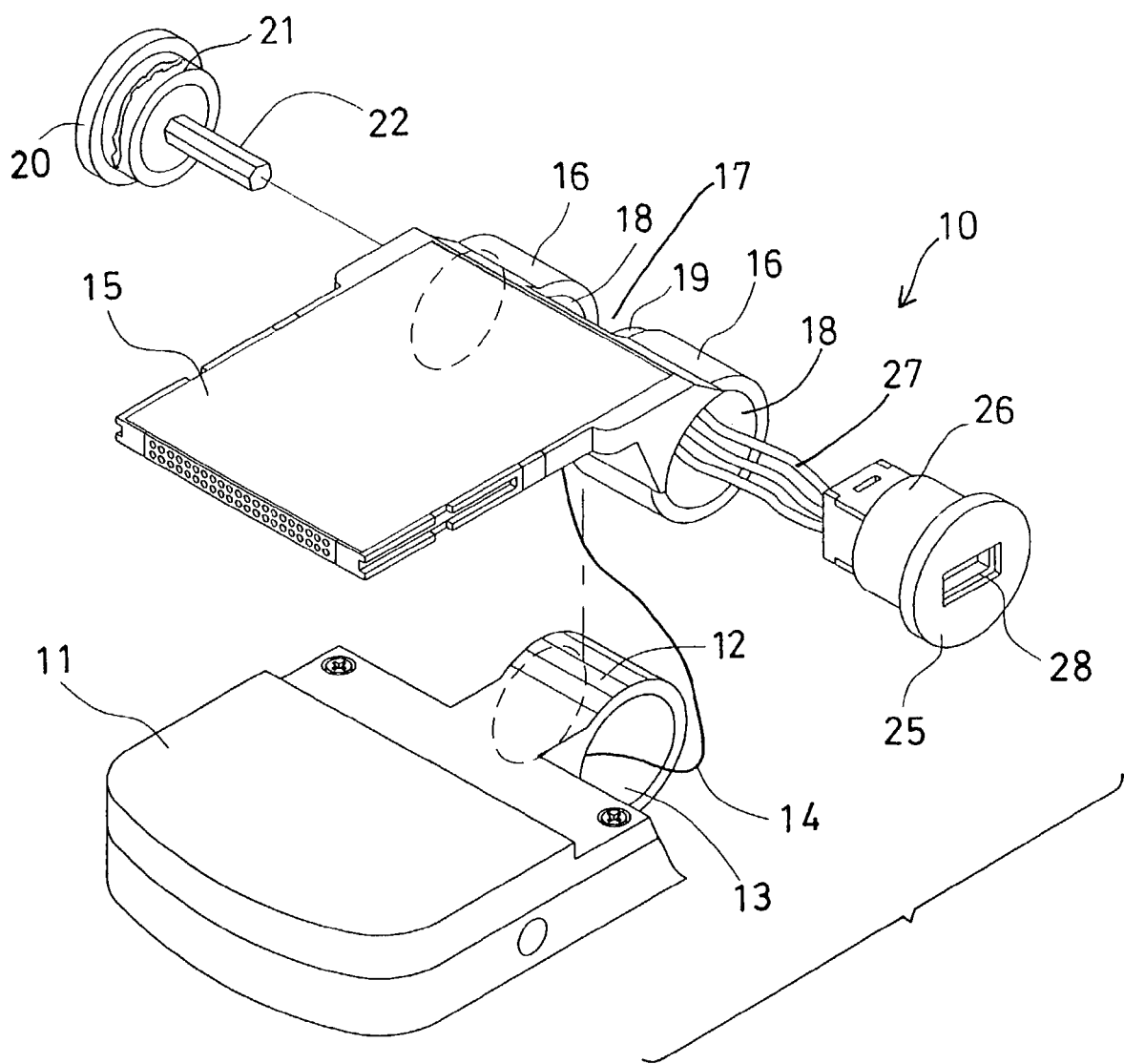
FIG. 3 is a partial exploded view of the receiver device of the foldable satellite receiver assembly.

As shown in FIGS. 2 and 3, the remote receiver device 10 includes a processor or control member 11 having a duct 12 formed or provided on one end thereof. The duct 12 includes a bore 13 formed therein to receive electric wires 14 or the like therein. The remote receiver device 10 further includes a card member 15 to be pivotally or rotatably coupled to the control member 11.

For example, the card member 15 includes one or more, such as two conduits 16 formed or provided on one end thereof, to form or define a space 17 between the conduits 16, and to receive the duct 12 of the control member 11 in the space 17 of the card member 15. Each of the conduits 16 includes a bore 18 formed therein and aligned with the bore 13 of the duct 12, to receive electric wires 14, 27 or the like therein.

A first one of the conduits 16 may include a stud 19 of a reduced diameter extended from the inner portion thereof, to engage into one end of the duct 12, and to pivotally or rotatably secure the duct 12 to the conduits 16, and thus to pivotally or rotatably secure the control member 11 and the card member 15 together.

A cap 20 is engaged onto an outer end of a second one of the conduits 16 of the card member 15, and includes a shaft 21 extended therefrom and engaged into the bores 18, 13 of the second conduit 16 and the duct 12, in order to further pivotally or rotatably secure the duct 12 to the conduits 16, and thus to pivotally or rotatably secure the control member 11 to the card member 15. The cap 20 may further include a lock stem 22 extended from the shaft 21.

Another cap 25 is engaged onto an outer end of the first conduit 16 of the card member 15, and includes a pole 26 extended therefrom and engaged into the bores 18 of the first conduit 16, and includes one or more electric cables 27 electrically coupled to the card member 15, and includes a socket opening 28 formed in the outer portion thereof. The lock stem 22 of the cap 20 may engage into the pole 26 of the cap 25, in order to secure or lock the caps 20, 25 together, and so as to rotatably secure the control member 11 and the card member 15 together.

Figure 4:
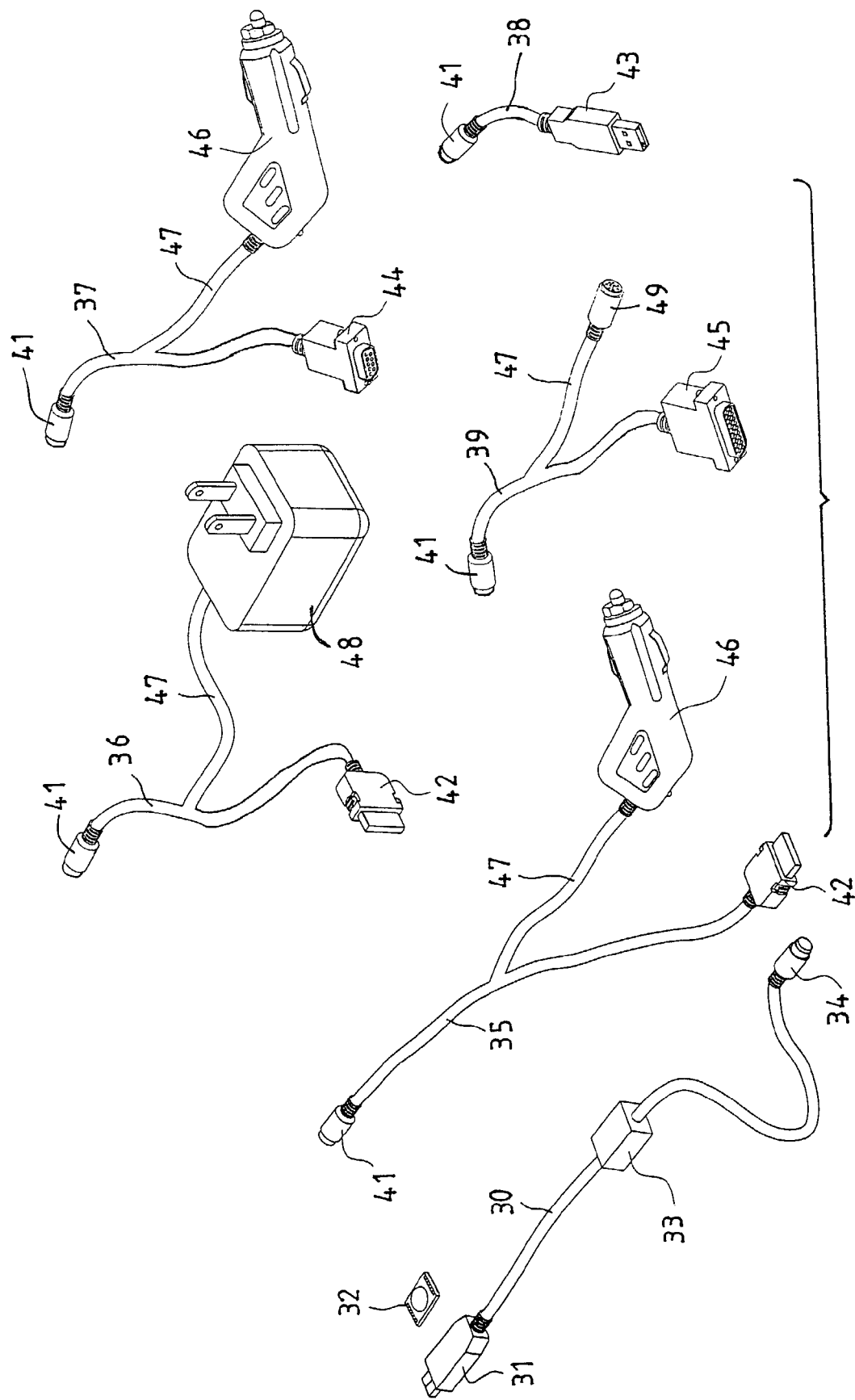
FIG. 4 is an exploded view of a cable assembly of the foldable satellite receiver assembly.
Figure 5:
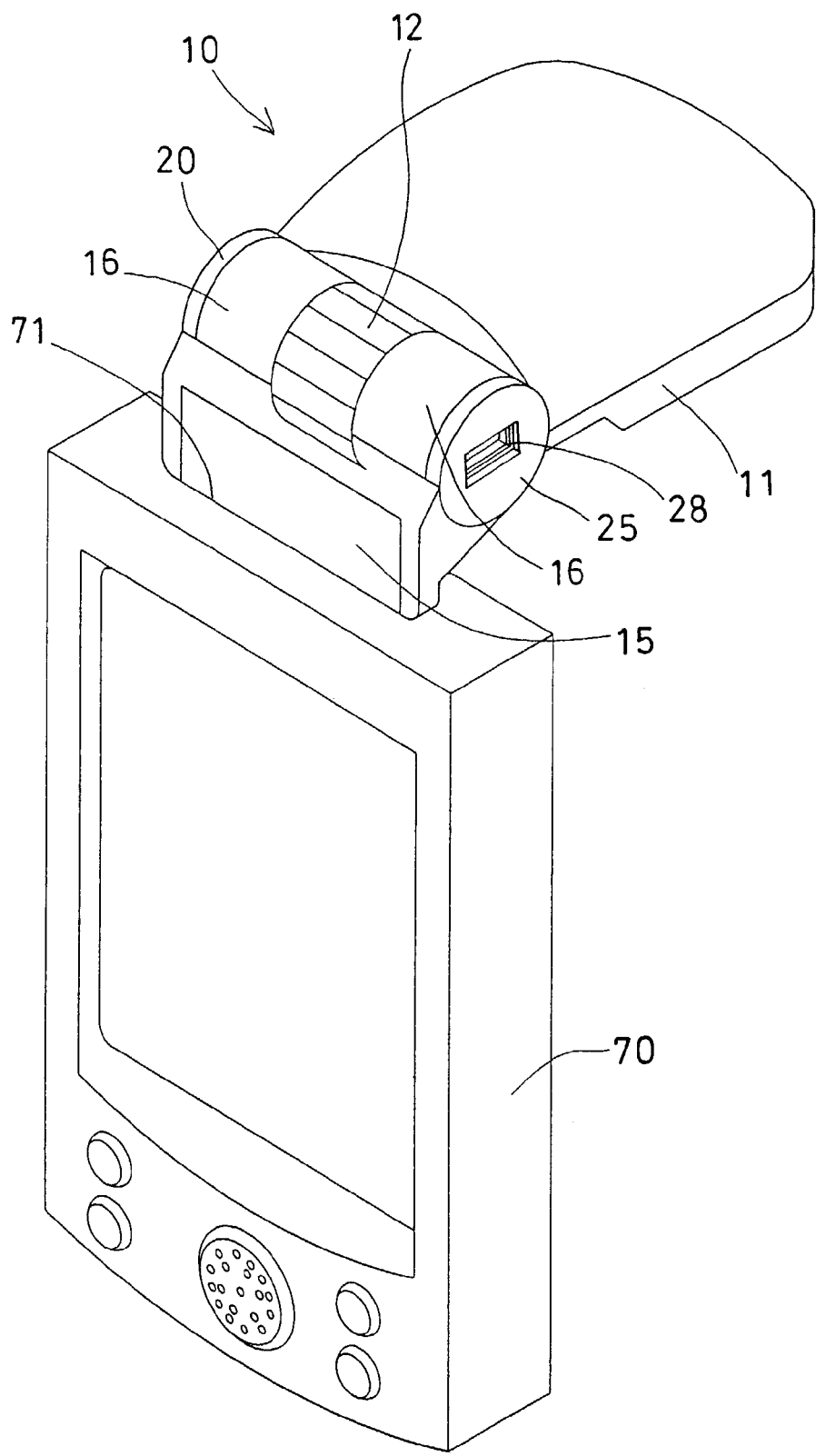
FIG. 5 is a perspective view illustrating the operation of the foldable satellite receiver assembly.
Figure 6:
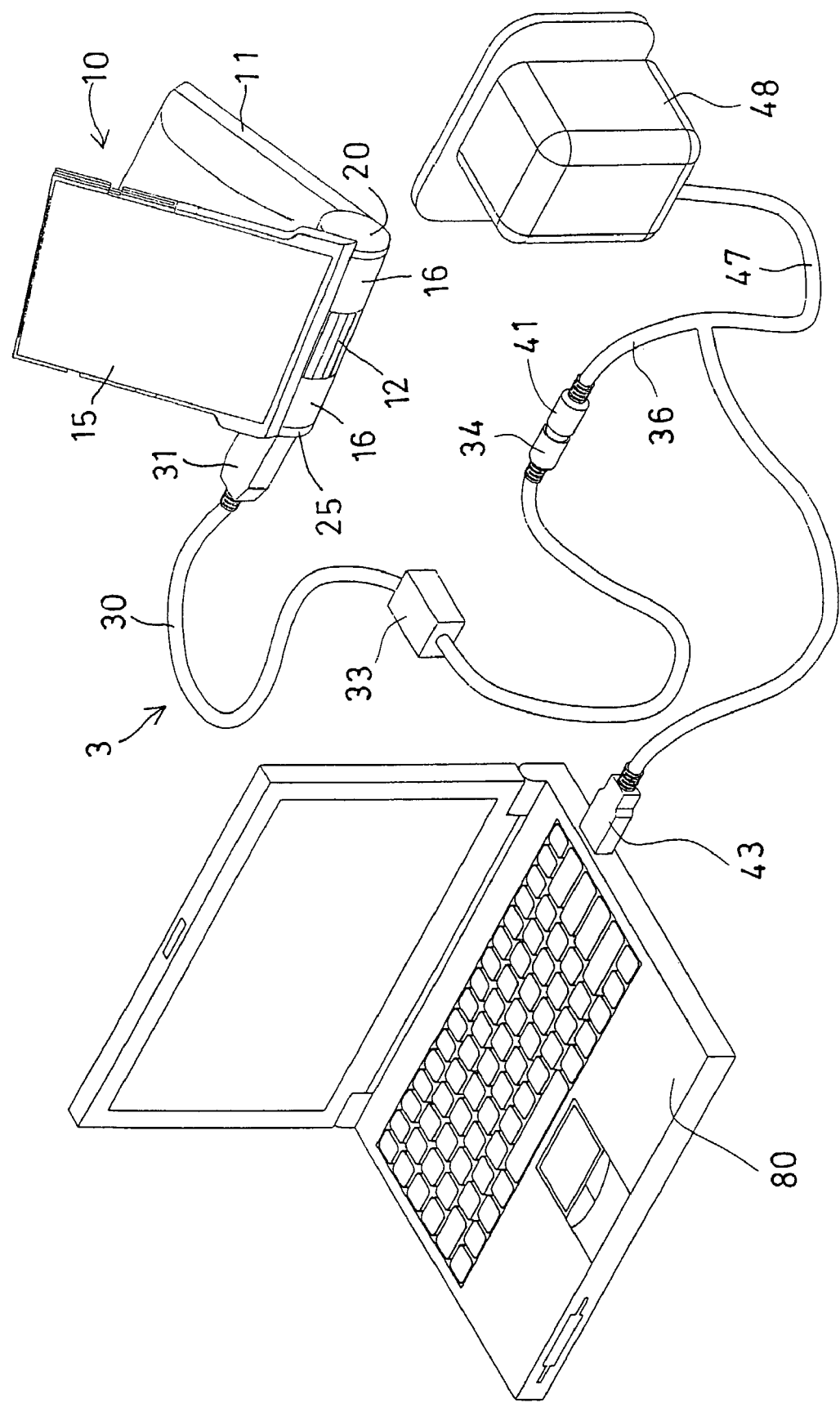
FIG. 6 is a perspective view illustrating the other application of the foldable satellite receiver assembly.

In operation, as shown in FIG. 5, the card member 15 of the remote receiver device 10 may be directly engaged or plugged into a socket opening 71 of the PDA facilities 70, or indirectly coupled to the PDA facilities 70 (FIG. 1) or other computer facilities 80 (FIG. 6) via a cable assembly 3 (FIGS. 1, 4, 6).

As shown in FIGS. 1, 3, 6, the cable assembly 3 includes a first cable member 30 having a plug or coupler 31 provided on one end thereof, for coupling or plugging to the socket opening 28 of the remote receiver device 10, and includes an integrated circuit or processor unit 32 engaged in the plug 31 for communicating with or for coupling to the remote receiver device 10, and may further include an integrated circuit or processor unit 33 engaged therein for signal processing purposes, and may include another plug or coupler 34 provided on the other end thereof, for coupling purposes.

The cable assembly 3 further includes one or more further cable members 35, 36, 37, 38, 39 each having a plug or coupler 41 provided on one end thereof, for coupling or plugging to the coupler 34 of the first cable member 30, and each having another plug or coupler 42, 43, 44, 45 provided on the other end thereof, for coupling to various computer facilities.

For example, the coupler 42 of the cable member 35 may be plugged or coupled to the PDA facilities 70 (FIG. 1). The coupler 42 of the cable members 35, 36 may be plugged or coupled to the personal computers or notebook computers 80 (FIG. 6). The coupler 44 of the cable member 37 may be a ninepin coupler, and the coupler 45 of the cable member 39 may be a universal serial bus (USB) for coupling to various computer facilities.

The cable members 35, 36, 37 may further include an adapter or plug or coupler 46 or 48 coupled thereto with a manifold 47, for plugging or coupling to the electric power sources of vehicles, or may further include a different coupler 49 coupled thereto with the manifold 47, for plugging or coupling to the other electric facilities. Accordingly, the remote receiver device 10 may be coupled to various computer facilities with the cable assembly 3.

In operation, as shown in FIG. 5, when the remote receiver device 10 is coupled to various computer facilities 70 directly, the control member 11 of the remote receiver device 10 may be rotated or adjusted relative to the card member 15 to various angular positions, in order to effectively or suitably receive remote signals.

Alternatively, as shown in FIGS. 1 and 6, the remote receiver device 10 may also be coupled to various computer facilities 70, 80 indirectly with the cable assembly 3, and may thus be disposed at any suitable position, in order to effectively or suitably receive remote signals.

Accordingly, the foldable satellite receiver assembly in accordance with the present invention includes a foldable structure for allowing the satellite or remote receiver assembly to be adjusted to suitable angular position, in order to effectively or suitably receive signals, and includes a cable assembly for allowing a remote receiver device of the remote receiver assembly to be easily coupled to various computer facilities.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A remote receiver assembly comprising: a computer facility, and a remote receiver device including a card member for plugging to said computer facility, and including a control member for receiving remote signals, said control member including a duct, said card member including at least one conduit rotatably coupled to said duct of said control member, to rotatably couple said control member to said card member;

wherein said remote receiver device includes a first cap attached to said at least one conduit, and a shaft extended from said first cap and engaged through said at least one conduit and said duct, to rotatably couple said duct and said at least one conduit together;

wherein said remote receiver device further includes a second conduit provided on said card member, and a second cap attached to said second conduit and having a pole extended from said second cap and engaged into said second conduit; and wherein said first cap includes a lock stem extended from said shaft, and engaged with said pole, to lock said first and said second caps together.

2. A remote receiver assembly comprising: a computer facility, and a remote receiver device including a card member for plugging to said computer facility, and including a control member for receiving remote signals, said control member including a duct, said card member including at least one conduit rotatably coupled to said duct of said control member, to rotatably couple said control member to said card member;

said remote receiver further comprising a cable assembly for coupling said remote receiver device to said computer facility; and wherein said remote receiver device includes a cap attached to said at least one conduit and having a socket opening provided therein, said cable assembly includes a first cable member and at least one second cable member, said first cable member includes a first end having a first coupler provided thereon for coupling to said socket opening of said cap, and a second end having a second coupler provided thereon, and said at least one second cable member includes a first end having a third coupler provided thereon for coupling to said second coupler of said first cable member, and a second end having a fourth coupler provided thereon for coupling to said computer facility.

3. The receiver assembly as claimed in claim 2, wherein said at least one second cable member includes a fifth coupler coupled thereto with a manifold, for coupling to electric power sources.

* * * * *